(12) United States Patent
Takamatsu

(10) Patent No.: US 9,507,345 B2
(45) Date of Patent: Nov. 29, 2016

(54) VEHICLE CONTROL SYSTEM AND METHOD

(71) Applicant: Nissan North America, Inc., Franklin, TN (US)

(72) Inventor: Yoshiro Takamatsu, Sunnyvale, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 139 days.

(21) Appl. No.: 14/249,869

(22) Filed: Apr. 10, 2014

(65) Prior Publication Data

US 2015/0293534 A1  Oct. 15, 2015

(51) Int. Cl.
| | |
|---|---|
| *G01C 22/00* | (2006.01) |
| *G05D 1/00* | (2006.01) |
| *G06F 7/70* | (2006.01) |
| *G06F 19/00* | (2011.01) |
| *G06G 7/00* | (2006.01) |
| *G06G 7/76* | (2006.01) |
| *B60T 7/12* | (2006.01) |
| *G06K 9/00* | (2006.01) |
| *B60W 30/00* | (2006.01) |

(52) U.S. Cl.
CPC ............ *G05D 1/0061* (2013.01); *B60T 7/12* (2013.01); *B60W 30/00* (2013.01); *G06K 9/00597* (2013.01); *G06K 9/00845* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,068,154 B2 | 6/2006 | Kudo | |
| 7,205,888 B2 | 4/2007 | Isaji et al. | |
| 2005/0123173 A1* | 6/2005 | Isaji | G08G 1/166 382/104 |
| 2012/0092173 A1* | 4/2012 | Sanchez | A61B 3/113 340/576 |
| 2013/0024075 A1* | 1/2013 | Zagorski | G08G 1/166 701/46 |

* cited by examiner

*Primary Examiner* — Fadey Jabr
*Assistant Examiner* — Lail Kleinman
(74) *Attorney, Agent, or Firm* — Global IP Counselors, LLP

(57) ABSTRACT

A vehicle control system and method employs a sensing system and a controller. The sensing system is disposed on a host vehicle and configured to sense a visual condition of a driver of the host vehicle. The controller is configured to control an autonomous vehicle control system on board the host vehicle to stop the host vehicle at a stopping location based on the visual condition and at least one point of interest external to the host vehicle.

17 Claims, 6 Drawing Sheets

VEHICLE CONTROL SYSTEM AND METHOD

BACKGROUND OF THE INVENTION

Field of the Invention

The present invention generally relates to a vehicle control system and method. More specifically, the present invention relates to a vehicle control system and method that is configured to control an autonomous vehicle control system on board a host vehicle to stop the host vehicle at a stopping location that is advantageous to the driver.

Background Information

As understood in the art, an autonomous vehicle includes a control system that is capable of performing driving operations to guide the vehicle to a predetermined destination without input from the driver or with only minimal input from the driver. The control system typically uses a plurality of high speed cameras to monitor areas surrounding the vehicle. The cameras detect, for example, traffic lights, signs, intersection markers, other vehicles and obstacles, and provide visual data to the control system. The control system can analyze this data to control driving of the vehicle during travel, and can control the deceleration and steering of the vehicle to stop the vehicle at an appropriate location which can be, for example, before an intersection, based on the field of view of the cameras.

SUMMARY OF THE INVENTION

As can be appreciated from the above, situations may arise during which the driver may desire to assume control of the vehicle. For instance, the driver may wish to monitor the conditions at an intersection, and make an appropriate right turn on red. However, because the stopping location of the vehicle is determined based on the cameras in existing autonomous vehicle control systems, the autonomous vehicle control system may stop the vehicle at a location at which the driver is unable to optimally see the traffic signal or other points of interest around the intersection. Therefore, a need exists for an improved autonomous vehicle control system.

In accordance with one aspect of the present invention, a disclosed embodiment provides a vehicle control system and method employing a sensing system and a controller. The sensing system is disposed on a host vehicle and configured to sense a visual condition of a driver of the host vehicle. The controller is configured to control an autonomous vehicle control system on board the host vehicle to stop the host vehicle at a stopping location based on the visual condition and at least one point of interest external to the host vehicle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
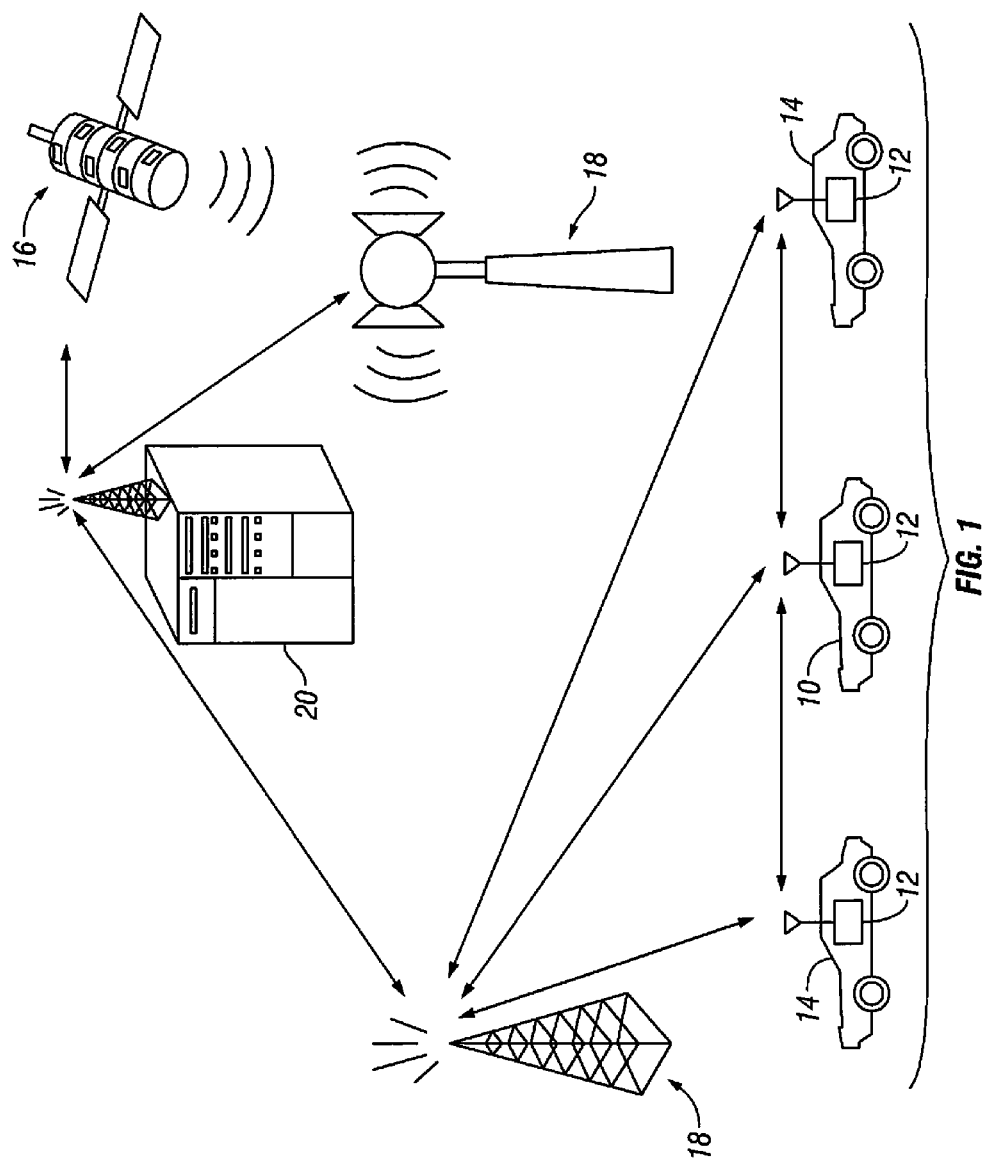
FIG. 1 is a block diagram illustrating an example of a host vehicle equipped with an vehicle control system according to embodiments disclosed herein in relation to remote vehicles and components of a wireless communication network.

FIG. 1 is a block diagram illustrating a host vehicle (HV) 10 that is equipped with vehicle control system 12 according to a disclosed embodiment that can control an autonomous vehicle control system on board the host vehicle 10 to stop the host vehicle 10 at a stopping location that is advantageous to the driver as discussed herein. The host vehicle 10 can also be referred to as a subject vehicle (SV). The vehicle control system 12 communicates with at least one remote vehicle (RV) 14 that can also include a vehicle control system 12. Alternatively, the remote vehicle 14 can include another type of two-way communication system, such as an adaptive cruise control system, that is capable of communicating information about at least the location and speed of the remote vehicle 14 as understood in the art.

The vehicle control system 12 of the host vehicle 10 and the remote vehicle 14 communicates with a two-way wireless communications network. As seen in FIG. 1, for example, the two-way wireless communications network can include one or more global positioning satellites 16 (only one shown), and one or more terrestrial units, such as roadside (terrestrial) units 18 (two are shown), and a base station or external server 20. The global positioning satellites 16 and the roadside units 18 send and receive signals to and from the vehicle control system 12 of the host vehicle 10 and the remote vehicles 14. The base station 20 sends and receives signals to and from the vehicle control system 12 of the host vehicle 10 and the remote vehicles 14 via a network of the roadside units 18, or any other suitable two-way wireless communications network.

Figure 2:
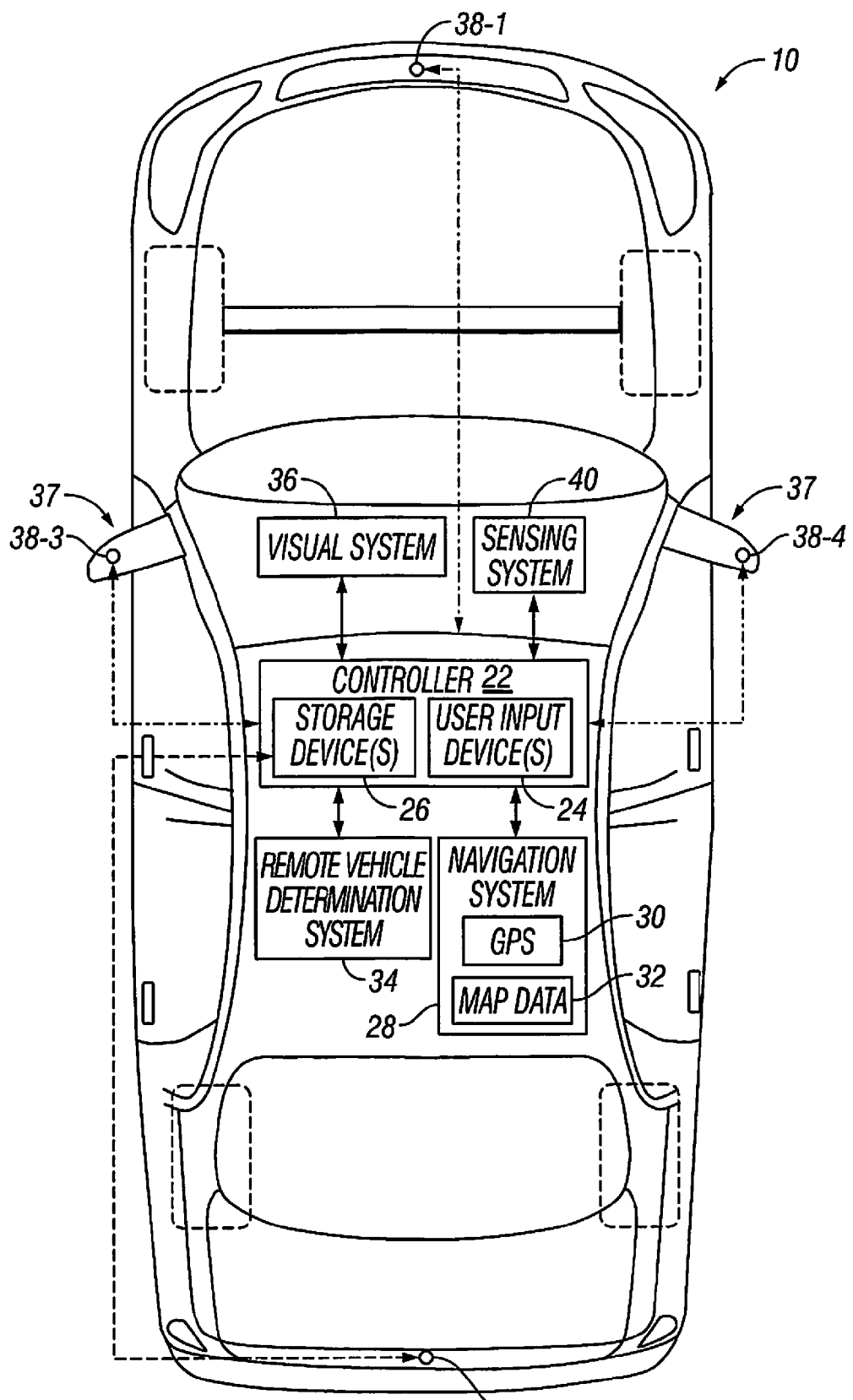
FIG. 2 is a block diagram of exemplary components of the host vehicle equipped with an vehicle control system according to embodiments disclosed herein.
Figure 3:
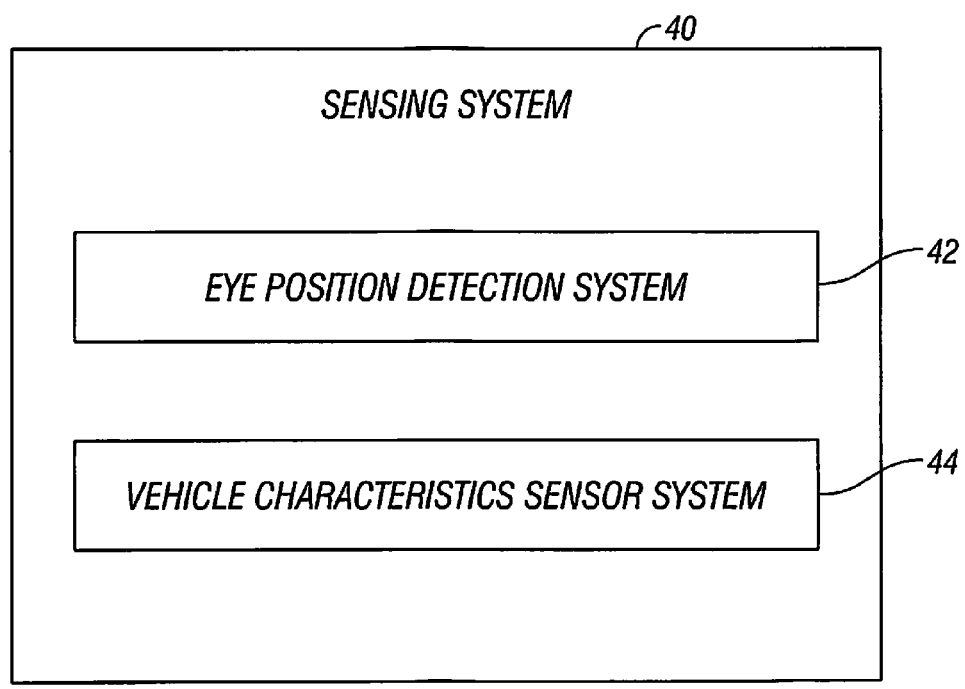
FIG. 3 is a block diagram of exemplary components of a sensing system of the vehicle control system as shown in FIG. 2.

As shown in more detail in FIGS. 2 and 3, the vehicle control system 12 includes a controller 22. The controller 22 preferably includes a microcomputer with a control program that controls the components of the vehicle control system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the vehicle control system 12 in accordance with the flow chart of FIGS. 6 and 7 discussed below. It will be apparent to those skilled in the art from this disclosure that the precise structure and algorithms for the controller 22 can be any combination of hardware and software that will carry out the functions of the present invention. Furthermore, the controller 22 can communicate with the other components of the vehicle control system 12 discussed herein via, for example a controller area network (CAN) bus or in any other suitable manner as understood in the art.

As shown in more detail in FIG. 2, the controller 22 can include or be in communication with user input devices 24. The user input devices 24 can include, for example, a human-machine interface (HMI) which enables a user (e.g., the driver and/or passenger) to interact with the vehicle control system 12 as understood in the art and discussed herein. The controller 22 can further include or be in communication with one or more storage devices 26 which can store information as discussed herein.

As further shown in FIG. 2, the vehicle control system 12 in this example includes or is in communication with a vehicle navigation system 28. The vehicle navigation system 28 can be, for example, a global positioning system (GPS) navigation system or any other suitable type of navigation system as known in the art. The vehicle navigation system 28 includes, for example, a communication device 30, such as a GPS communication device that communicates with the GPS satellites 16. The communication device 30 can also communicate with one or more terrestrial units 18 and a base station or external server 20 to obtain location information. Furthermore, the vehicle navigation system 28 in this example includes or is in communication with a storage device 32 that can store map data and other location related data as understood in the art.

The vehicle control system 12 in this example also includes or is in communication with a remote vehicle determination system 34. As understood in the art, the remote vehicle determination system 34 communicates with the remote vehicles 14 within a communication range of the host vehicle 10 to exchange vehicle data between the host vehicle 10 and the remote vehicles 14. This vehicle data received from a remote vehicle 14 can include information pertaining to the location of that remote vehicle 14, the speed of that remote vehicle 14, information such as braking information, turn signal information and so on which indicates whether the remote vehicle 14 is preparing to turn or change lanes, and any additional information that can enable the vehicle control system 12 to ascertain the location and movement of the remote vehicle 14.

The vehicle control system 12 in this example further includes or is in communication with a visual system 36. The visual system 36 can include a display device that displays, for example, navigation information which indicates the location of the host vehicle 10 with respect to a map as understood in the art. The visual system 36 also includes the mirrors 37 of the host vehicle, such as the driver side mirror, passenger side mirror and rear view mirror. The controller 22 can receive information pertaining to the respective positions of the mirrors 37 on the host vehicle 10 and the respective tilt angles of the mirrors 37 as understood in the art.

In addition, the host vehicle 10 is equipped with at least one imaging device such as a high-speed camera. In this example, the host vehicle 10 includes a front imaging device 38-1, a rear imaging device 38-2, a driver side imaging device 38-3 and a passenger side imaging device 38-4. The imaging devices 38-1 through 38-4 are positioned on the host vehicle 10 to capture real time images to provide 360 degree field of view imaging about the entire exterior perimeter of the host vehicle 10. The controller 22 in this example receives the image data from the imaging devices 38-1 through 38-4 and controls the visual system 36 to display images representing the images captured by the imaging devices 38-1 through 38-4 for viewing by the driver and/or the passenger(s) as discussed herein. The user such as the driver and/or passenger(s) can operate the user input devices 24 to change the images being displayed by the visual system 36. For instance, the user can control the visual system 36 to display the images captured by any of the imaging devices 38-1 through 38-4 as desired. The user can also control the visual system 36 to switch between, for example, displaying navigation information, displaying images captured by the imaging devices 38-1 through 38-4, and displaying any other type of information as understood in the art. Furthermore, the host vehicle 10 can include various types of audio and tactile devices that the controller 22 can control to provide audio and/or tactile information, such as warnings, to be perceived by the driver.

As further shown in FIG. 2 and in more detail in FIG. 3, the vehicle control system 12 in this example further includes or is in communication with a sensing system 40 that is located on the host vehicle 10. The sensing system 40 can include a plurality of sensors that sense various conditions of the host vehicle 10. For instance, the sensing system 40 includes an eye position detection system 42 that can include imaging and other monitoring devices as understood in the art to identify the position of the driver's eyes for purposes discussed herein. The sensing system 40 further includes vehicle characteristic sensors that are operable to sense, for example, the speed (e.g., actual vehicle velocity and wheel velocity), acceleration (e.g., amount of accelerator depression), braking (e.g., amount of braking), steering wheel position (e.g., steering wheel angle), turn signal activation (e.g., right or left turn indication), yaw rate and so on pertaining to the host vehicle 10.

As will now be discussed, the controller 22 of the vehicle control system 12 is further configured to control an autonomous vehicle control system on board the host vehicle 10 to stop the host vehicle 10 at a stopping location that is advantageous to the driver. In the examples discussed below, the controller 22 determines an appropriate point to stop the host vehicle 10 at a road intersection. The embodiments described herein can also be used to determine a stopping location at the shoulder of the road, in a parking lot, at a location along a narrow road, at locations during stop-and-go driving condition, and any other suitable types of stopping locations.

The host vehicle 10 can be configured as an autonomous vehicle which, as understood in the art, performs driving operations to guide the vehicle 10 to a predetermined destination without input from the driver or with minimal input from the driver. The control system for performing the autonomous vehicle operations can be included as part of the controller 22 or can be a separate controller or controllers. The control system uses a plurality of high-speed cameras, such as imaging devices 38-1 through 38-4, to monitor areas surrounding the host vehicle 10. The cameras detect, for example, traffic lights, signs, intersection markers, other vehicles 14, obstacles and other points of interest, and provide visual data to the control system (e.g., the controller 22). The control system analyzes this data to control acceleration, deceleration and steering of the host vehicle 10.

Figure 4:
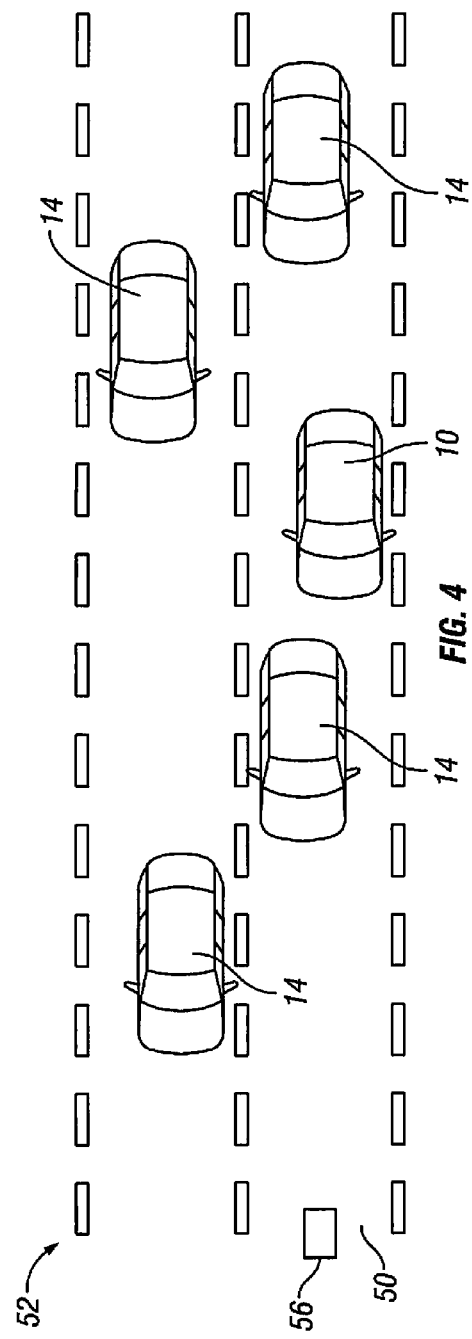
FIG. 4 is a diagrammatic view of a host vehicle and remote vehicles traveling on a road.

For example, as shown in FIG. 4, the host vehicle 10 is travelling on a road 50 along with other remote vehicles 14. The imaging devices 38-1 through 38-4 capture real time images and provides image data to the autonomous vehicle control system. For purposes of this example, the autonomous vehicle control system will be described as being included in the controller 22 which performs the autonomous vehicle control system operations. As understood in the art, the controller 22 analyzes this image data, along with vehicle condition data provided by the sensing system 40, navigation and map data provided by the vehicle navigation system 28, and data pertaining to the remote vehicles 14 provided by the remote vehicle determination system 34 as discussed above, and controls driving of the host vehicle 10. That is, the controller 22 controls the acceleration, deceleration, braking and steering of the host vehicle 10 without input from the driver, or with only minimal input from the driver, to drive the host vehicle 10 along the road 50 as understood in the art.

Figure 5:
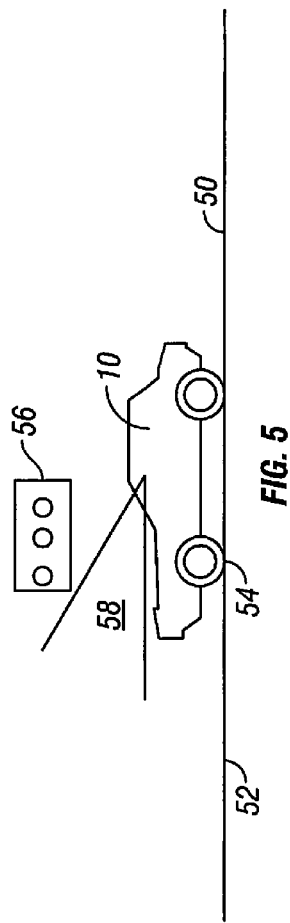
FIG. 5 is a diagrammatic view of a host vehicle in relation to an intersection.

However, situations may arise during which the driver may desire to assume control of the host vehicle 10. For instance, the driver may wish to monitor the conditions at an intersection 52 as shown in FIG. 5, and take certain action such as make an appropriate right turn on red. However, because autonomous vehicle control system determined the stopping location of the vehicle 10 based on the data from the imaging devices 38-1 through 38-4, the autonomous vehicle control system may stop the host vehicle 10 at a stopping location 54 at which the driver is unable to optimally see the traffic signal 56 or other points of interest around the intersection 52. For instance, due to the driver's height and thus, the driver's eye position with respect to the windshield of the host vehicle 10, the traffic signal 56 may be out of the driver's field of view 58 while the host vehicle 10 is stopped at the stopping location 54. Thus, the driver may not have enough information, in particular, visual information, in order to make the appropriate decisions with regard to controlling the host vehicle 10 to, for example, make a right turn.

Figure 6:
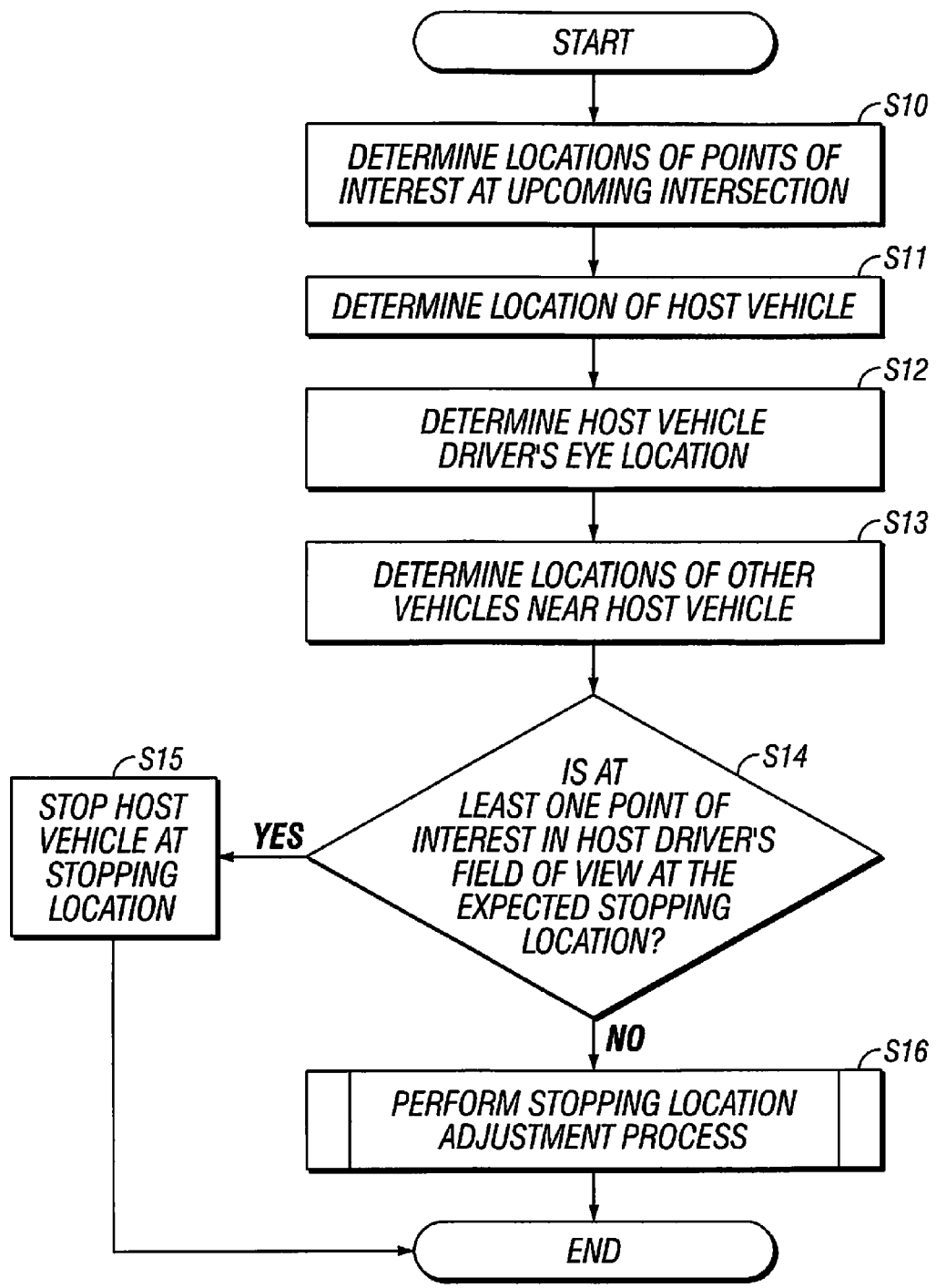
FIGS. 6 and 7 are flowcharts illustrating examples of operations performed by the vehicle control system according to embodiments disclosed herein.
Figure 7:
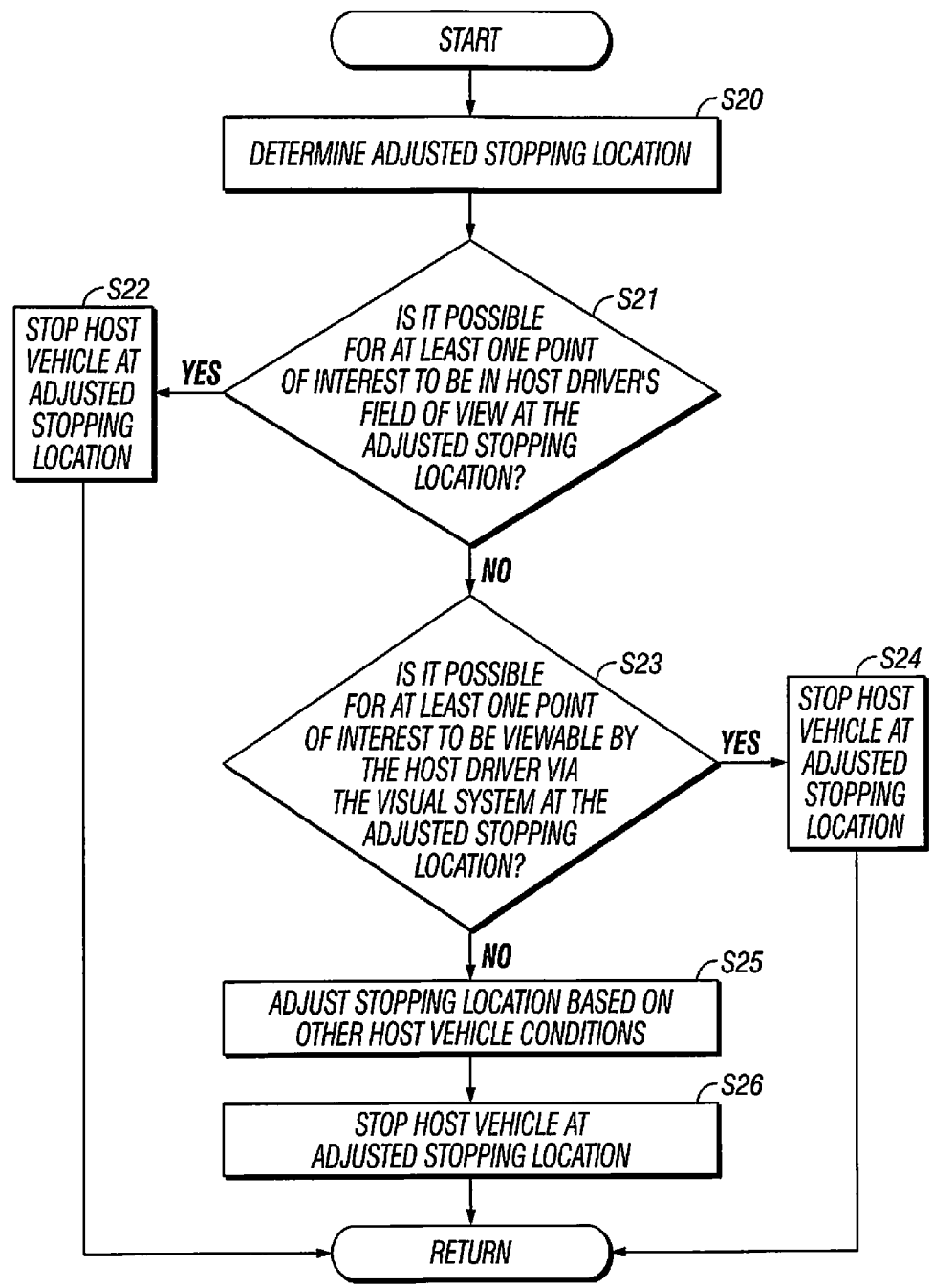

Accordingly, the vehicle control system 12 according to the disclosed embodiments uses visual information pertaining to a visual condition of the driver of the host vehicle 10 to control the autonomous vehicle control system to stop the host vehicle 10 at a stopping location 54 based on the visual condition and at least one point of interest external to the host vehicle 10. In the example shown in FIG. 5, the controller 22 can perform operations as shown in the flowchart of FIGS. 6 and 7 to control the autonomous vehicle control system to stop the host vehicle 10 at a stopping location 54. Although the example shown in FIG. 5 and discussed below pertains to a stopping location at an intersection 52, the embodiments described herein can be used to determine a stopping location at the shoulder of the road 50, in a parking lot, at a location along a narrow road, at locations during stop-and-go driving condition, and any other suitable types of stopping locations.

In step S10, the controller 22 determines points of interest at an upcoming intersection 52. The points of interest include, for example, one or more of the following: A point of interest can be the traffic signal 56 of the current lane in which the host vehicle 10 is present in order for the driver to understand why the autonomous vehicle control system has stopped the host vehicle 10 (e.g., when the traffic signal 56 is turning from green to red) and why the autonomous vehicle control system is controlling the host vehicle 10 to begin moving again (e.g., when the traffic signal 56 turns green). Another point of interest can also be the traffic signals 56 of all of the lanes of the road 50 in the same travel direction in order for the driver to understand why the autonomous vehicle control system has stopped the host vehicle 10 (e.g., when the traffic signals 56 are turning from green to red) and why the autonomous vehicle control system is controlling the host vehicle 10 to begin moving again (e.g., when the traffic signals 56 turn green). A further point of interest can also be a traffic signal 56 of any of the lanes of the road 50 in the same travel direction in order for the driver to understand why the autonomous vehicle control system has stopped the host vehicle 10 (e.g., when the traffic signals 56 are turning from green to red) and why the autonomous vehicle control system is controlling the host vehicle 10 to begin moving again (e.g., when the traffic signals 56 turn green).

In addition, a point of interest can be a road sign (e.g. a right turn only arrow) painted on the road 50 near the stopping position of the host vehicle 10 so that the driver can understand the traffic regulation for the lanes of the road 50. Also, a point of interest can be a traffic sign which indicates to the driver a regulation pertaining to that portion of the road (e.g., no parking). Furthermore, a point of interest can be a remote vehicle 14 that the driver can see within the driver's field of view 58 or by a mirror on the host vehicle 10 (e.g., the remote vehicle 14 is not obstructed by a blind spot on the host vehicle 10). Still a further point of interest can be a pedestrian, such as a person walking, a person riding a bicycle, etc., that the driver can see within the driver's field of view 58 or by a mirror on the host vehicle 10 (e.g., the pedestrian is not obstructed by a blind spot on the host vehicle 10).

In step S11, the controller 22 determines the location of the host vehicle 10 based on, for example, the GPS information and other location related information as discussed above. In step S12, the controller 22 analyzes data provided by the eye position detection system 42 to identify the position (e.g., height) of the driver's eyes within the passenger compartment of the host vehicle 10. In step S13, the controller 22 analyzes the data provided by the remote vehicle determination system 34 to ascertain the locations of the remote vehicles 14 proximate to the host vehicle 10 as understood in the art. As can further be appreciated from the flowchart of FIG. 6, the controller 22 can perform the operations of steps S10 through S13 in any order, or can perform some or all of the operations simultaneously.

In step S14, the controller 22 determines whether at least one point of interest is expected to be within the host driver's field of view 58 at the expected stopping location at which the autonomous vehicle control system is expected to control the host vehicle 10 to stop. That is, the controller 22 analyzes the locations of the points of interest based on, for example, the data provided by the imaging devices 38-1 through 38-4, data provided via the communications network as shown in FIG. 1, the data provided by the eye position detection system 42 and the data provided by the remote vehicle determination system 34 to determine whether any of the points of interest are expected to be within the host driver's field of view 58 at the expected stopping location. For purposes of this example, the operations of step S14 are described as determining whether any of the points of interest is expected to be within the host driver's field of view at the expected stopping location. However, the operations in step S14 can be configured to determine whether more than one point of interest, or whether all points of interest, are expected to be within the host driver's field of view at the expected stopping location.

In this example, if at least one point of interest is expected to be within the driver's field of view at the expected stopping location, the controller 22 will control the autonomous vehicle control system to control, for example, the steering, braking and so on, of the host vehicle 10 to control the host vehicle 10 to stop at the expected stopping location in step S15. For instance, the controller 22 can control the autonomous vehicle control system to control the host vehicle 10 to stop at the expected stopping location which is 2.3 m away from the traffic signal 56 with the host vehicle 10 facing in a direction 12 degrees to the north. Thus, the controller 22 not only sets the stopping location of the host vehicle 10, but also sets the angle of travel at which the host vehicle 10 should be facing when stopped at the stopping location. The process will then end and be repeated when the autonomous vehicle control system is preparing to stop the host vehicle 10 at the next stopping location. However, if no point of interest is expected to be within the driver's field of view at the expected stopping location, the controller 22 will perform a stopping location adjustment process in step S16 and as shown in more detail in the flowchart of FIG. 7.

Furthermore, in the case where the controller 22 is configured to determine whether a certain number of points of interest that exist at or proximate to the expected stopping location are expected to be within the driver's field of view at the expected stopping location, the processing will proceed as a "no" condition to perform the stopping location adjustment process in step S16 if an insufficient number of the points of interest are expected to be within the driver's field of view. Similarly, in the case where the controller 22 is configured to determine whether all points of interest that exist at or proximate to the expected stopping location are expected to be within the driver's field of view at the expected stopping location, the processing will proceed as a "no" condition to perform the stopping location adjustment process in step S16 if any of the points of interest are not expected to be within the driver's field of view.

In step S20 shown in FIG. 7, the controller 22 determines an adjusted stopping location for the host vehicle 10. That is, the controller 22 analyzes the locations of the points of interest based on, for example, the data provided by the imaging devices 38-1 through 38-4, data provided via the communications network as shown in FIG. 1, and the data provided by the remote vehicle determination system 34, in conjunction with the data provided by the eye position detection system 42, and determines whether an adjusted stopping location exists at which at least one point of interest will be within the driver's field of view 58. The adjusted stopping location is different from the expected stopping location.

If the controller 22 determines in step S21 that an adjusted stopping location exists at which at least one point of interest will be within the driver's field of view 58, the controller 22 will control the autonomous vehicle control system in step S22 to stop the host vehicle 10 at the adjusted stopping location. The processing will then return to the flowchart in FIG. 6 and end, and then be repeated when the autonomous vehicle control system is preparing to stop the host vehicle 10 at the next stopping location. However, if the controller 22 determines in step S21 that no adjusted stopping location exists at which at least one point of interest will be within the driver's field of view 58, the controller 22 will proceed to step S23 as discussed below.

Also, as with the operations of step S14 discussed above, the operations in step S21 can be configured to determine whether more than one point of interests, or whether all points of interest, are expected to be within the host driver's field of view at the adjusted stopping location. In the case where the controller 22 is configured to determine whether a certain number of points of interest that exist at or proximate to the adjusted stopping location are expected to be within the host driver's field of view at the adjusted stopping location, the processing will proceed as a "no" condition to step S23 if an insufficient number of the points of interest are expected to be within the driver's field of view. Similarly, in the case where the controller 22 is configured to determine whether all points of interest that exist at or proximate to the adjusted stopping location are expected to be within the driver's field of view at the adjusted stopping location, the processing will proceed as a "no" condition to step S23 if any of the points of interest are not expected to be within the driver's field of view.

In step S23, the controller 22 analyzes the locations of the points of interest based on, for example, the data provided by the imaging devices 38-1 through 38-4, data provided by the communications network shown in FIG. 1, and the data provided by the remote vehicle determination system 34, in conjunction with the data provided by the eye position detection system 42, and determines whether at least one point of interest is expected to be viewable by the driver via the visual system 36 at the adjusted stopping location as discussed above. If the controller 22 determines in step S23 that at least one point of interest is expected to be viewable by the driver via the visual system 36 at the adjusted stopping location, the controller 22 will control the autonomous vehicle control system in step S24 to stop the host vehicle 10 at the adjusted stopping location. As discussed above, the visual system 36 can include a display screen that displays images captured by the imaging devices 38-1 through 38-4, as well as reflected images in the mirrors 37 of the host vehicle 10. The processing will then return to the flowchart in FIG. 6 and end, and then be repeated when the autonomous vehicle control system is preparing to stop the host vehicle 10 at the next stopping location. Alternatively, if the controller 22 determines in step S23 that no adjusted stopping location exists at which at least one point of interest is expected to be viewable by the driver via the visual system 36, the controller 22 will proceed to step S25. Naturally, the controller 22 can also set the adjusted stopping location as a location at which the controller 22 determines that the visual system 36 is expected to present to the driver an image representing at least some of the points of interest and the other of the points of interest is expected to reside within the field of view 58 of the driver.

Also, as with the operations of steps S14 and S21 discussed above, the operations in step S23 can be configured to determine whether more than one point of interests, or whether all points of interest, are expected to be viewable by the driver via the visual system 36 at the adjusted stopping location. In the case where the controller 22 is configured to determine whether a certain number of points of interest that exist at or proximate to the expected stopping location are expected to be viewable by the driver via the visual system 36 at the adjusted stopping location, the processing will proceed as a "no" condition to step S25 if an insufficient number of the points of interest are expected to be viewable by the driver via the visual system 36 at the adjusted stopping location. Similarly, in the case where the controller 22 is configured to determine whether all points of interest that exist at or proximate to the expected stopping location are expected to be are expected to be viewable by the driver via the visual system 36 at the adjusted stopping location, the processing will proceed as a "no" condition to step S23 if any of the points of interest are not expected to be viewable by the driver via the visual system at the adjusted stopping location. Naturally, the controller 22 can be configured to determine in step S23 whether more than one point of interests, or whether all points of interest, are expected to be viewable by the driver via a combination of the driver's field of view and the visual system 36 at the adjusted stopping location, and proceed in a manner consistent with that discussed above.

In step S25, the controller 22 operates to determine another adjusted stopping location for the host vehicle 10 in step S25. That is, the controller 22 analyzes, for example, data provided by the communications network shown in FIG. 1, the data provided by the vehicle navigation system 28, the data provided by the remote vehicle determination system 34, or a combination of these types of data, and determines an adjusted stopping location which can be, for example, a location along which the host vehicle 10 is travelling. The controller 22 can instead set the adjusted stopping location as a location based on information that the autonomous vehicle control system is using the plan the path of travel for the host vehicle 10. For instance, the adjusted stopping location can be a location which the driver is expected to be capable of understanding the current traffic conditions and the status of the host vehicle 10 so that the driver can make a decision to control the host vehicle 10 to, for example, make a lane change, make a left or right turn, or change the path of travel of the host vehicle 10. Naturally, the controller 22 can set the adjusted stopping location based on any other suitable factors pertaining to the host vehicle 10, the road 50, the presence of remote vehicles 14 or other obstacles, or a combination of these factors. The controller 22 will then control the autonomous vehicle control system in step S26 to stop the host vehicle 10 at that adjusted stopping location. The processing will then return to the flowchart in FIG. 6 and end, and then be repeated when the autonomous vehicle control system is preparing to stop the host vehicle 10 at the next stopping location.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle control system comprising:
a sensing system disposed on a host vehicle and configured to sense an eye location of an eye of driver of the host vehicle within a passenger compartment of the host vehicle; and
a controller configured to estimate a field of view of the driver based on the eye location, determine whether a point of interest external to the host vehicle is expected to reside within the field of view of the driver at an expected stopping location of the host vehicle based on the eye location and a location of the point of interest, control an autonomous vehicle control system on board the host vehicle to stop the host vehicle at the expected stopping location upon determining that the point of interest is expected to reside within the field of view of the driver at the expected stopping location, and control the autonomous vehicle control system to stop the host vehicle at an adjusted stopping location that is different from the expected stopping location upon determining that the point of interest is expected to reside outside the field of view of the driver at the expected stopping location.

2. The vehicle control system according to claim 1, wherein
the controller is configured to determine the adjusted stopping location as a location at which the controller determines that the point of interest is expected to reside within the field of view of the driver.

3. The vehicle control system according to claim 1, wherein
the controller is further configured to determine the adjusted stopping location as a location at which the controller determines at least one of the following:
a visual system on board the host vehicle is expected to present to the driver an image representing the point of interest; and
the point of interest is expected to reside within the field of view of the driver.

4. The vehicle control system according to claim 3, wherein
the visual system includes at least one of a visual display and a mirror.

5. The vehicle control system according to claim 1, wherein
the controller is further configured to determine the adjusted stopping location based on a traveling condition of the host vehicle.

6. The vehicle control system according to claim 1, wherein
the point of interest corresponds to a location of a traffic device.

7. The vehicle control system according to claim 1, wherein
the controller is further configured to control the autonomous vehicle control system on board the host vehicle to stop the host vehicle at the expected stopping location based on the eye location and respective locations of a plurality of additional points of interest upon determining that the point of interest and all of the additional points of interests are expected to reside within the field of view of the driver at the expected stopping location.

8. The vehicle control system according to claim 7, wherein
the controller is further configured to control the autonomous vehicle control system to stop the host vehicle at the adjusted stopping location upon determining that any of the additional points of interest is expected to reside outside the field of view of the driver at the expected stopping location.

9. The vehicle control system according to claim 8, wherein
the controller is configured to determine the adjusted stopping location as a location at which a visual system on board the host vehicle is expected to present to the driver an image representing a first group of the additional points of interest while a second group of the additional points of interest is expected to reside within the field of view of the driver.

10. The vehicle control system according to claim 1, wherein
the sensing system is further configured to sense at least one operating condition of the host vehicle; and the controller is further configured to control the autonomous vehicle control system to stop the host vehicle at the expected location based on the eye location, the point of interest and the at least one operating condition.

11. The vehicle control system according to claim 10, wherein
the at least one operating condition includes at least one of a speed and a steering angle of the host vehicle.

12. The vehicle control system according to claim 1, wherein
the sensing system is further configured to sense a location of at least one remote vehicle relative to a location of the host vehicle; and
the controller is further configured to control the autonomous vehicle control system to stop the host vehicle at the stopping location based on the visual condition eye location, the point of interest and the location of the at least one remote vehicle.

13. The vehicle control system according to claim 1, wherein
the sensing system is further configured to sense a present location of the host vehicle; and
the controller is further configured to control the autonomous vehicle control system to stop the host vehicle at the stopping location based on the eye location, the point of interest and the present location of the host vehicle.

14. The vehicle control system according to claim 1, wherein
the point of interest corresponds to a location of a remote vehicle.

15. The vehicle control system according to claim 1, wherein
the point of interest corresponds to a location of a pedestrian.

16. The vehicle control system according to claim 1, wherein
the point of interest corresponds to a location of a traffic sign.

17. The vehicle control system according to claim 1, wherein
the point of interest corresponds to a location of a marking on a road upon which the host vehicle is travelling.

* * * * *